United States Patent Office 3,555,019
Patented Jan. 12, 1971

3,555,019
[2H]-1,4-OXAZINE DERIVATIVES
Jean Clement Louis Fouche, Bourg-la-Reine, Hauts-de-Seine, and Gilbert Poiget, Thiais, Val-de-Marne, France, assignors to Rhone-Poulenc S.A., Paris, France, a French body corporate
No Drawing. Filed May 2, 1968, Ser. No. 726,235
Claims priority, application France, May 5, 1967, 105,382
Int. Cl. C07d 87/48
U.S. Cl. 260—244                                4 Claims

ABSTRACT OF THE DISCLOSURE 1,4-ozazine derivatives of the formula:

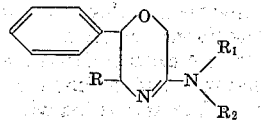

wherein R, $R_1$ and $R_2$ represents hydrogen or alkyl of 1 through 5 carbon atoms, and non-toxic acid addition and quaternary ammonium salts thereof, which are new compounds, are active as antidepressants, central stimulants, anorexigencis, hypertensives and antihypotensives.

---

This invention relates to new therapeutically useful dihydro-1,4-oxazine derivatives, to a process for their preparation and pharmaceutical compositions containing them.

According to the present invention, there are provided the new 5,6-dihydro[2H]-1,4-oxazine derivatives of the general formula:

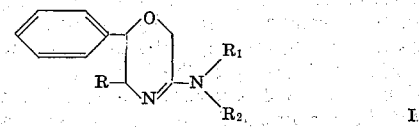                        I wherein R, $R_1$ and $R_2$ are the same or different and each represents a hydrogen atom or an alkyl group containing at most 5 carbon atoms, and acid addition and quaternary ammonium salts thereof.

According to a feature of the present invention, the compounds of Formula I are prepared by reacting an amine of the general formula:

                        II (wherein $R_1$ and $R_2$ are as hereinbefore defined) or the corresponding acetate, with a 5,6-dihydro[2H]-1,4-oxazine derivative of the general formula:

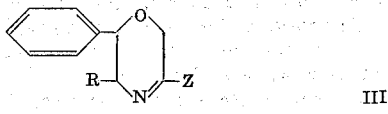                        III wherein Z represents an alkoxy or alkylthio group containing 1 to 3 carbon atoms, a halogen atom or a radical —O—CO—Cl, —O—SO—Cl or —O—PO—$Cl_2$, and R is as hereinbefore defined. The reaction is effected by heating the reactants at temperatures between 50° and 150° C. in the absence or presence of an inert organic solvent, for example ethanol.

The 5,6-dihydro[2H]-1,4-oxazine derivatives wherein Z represents an alkoxy group, employed as starting materials can be obtained by the action of triethyloxonium fluoroboride [$(C_2H_5)_3O^+BF_4^-$] in the case where Z represents the ethoxy group, or by the action of a reactive ester of the general formula $R_3$—Y, wherein $R_3$ represents an alkyl group having from 1 to 3 carbon atoms and Y represents the acid residue of a reactive ester, such as a halogen atom or a sulphuric or sulphonic ester residue, on a morpholine derivative of the general formula:

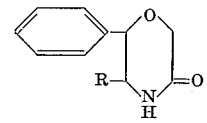                        IV wherein R is as hereinbefore defined. The reaction is generally effected at a temperature between 10° and 50° C. in an organic solvent such as dioxan or methylene chloride.

The starting materials of Formula III, wherein Z represents a chlorine atom, can be prepared by the action of phosgene or thionyl chloride on a morpholine derivative of Formula IV followed by removal of carbon dioxide or sulphur dioxide from the intermediate obtained.

The starting materials of Formula III, wherein Z represents the radical —O—CO—Cl, —O—SO—Cl or —O—PO—$Cl_2$, can be prepared by the action of phosgene, thionyl chloride or phosphorus oxychloride ($POCl_3$) on a morpholine derivative of Formula IV.

The 5,6-dihydro[2H]-1,4-oxazine starting materials of Formula III, wherein Z represents an alkylthio group, can be obtained by the action of a reactive ester of the formula $R_3$—Y, wherein $R_3$ and Y are as hereinbefore defined, on a morpholine derivative of the general formula:

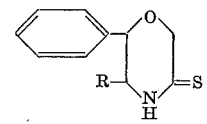                        V wherein R is as hereinbefore defined. The reaction is effected by adding the reactive ester $R_3$—Y to a solution or suspension of the morpholine-thione of Formula V in an organic solvent, such as dioxan or methylene chloride, at a temperature between 10° and 50° C.

The morpholine derivatives of Formula V can be obtained by the action of phosphorus pentasulphide ($P_2S_5$) on a morpholine derivative of Formula IV, the reaction being effected by heating the reactants in an organic solvent, such as pyridine, at the boiling temperature of the solvent.

The 5,6-dihydro[2H]-1,4-oxazine derivatives of general Formula I obtained by the aforementioned process may be purified by physical methods such as distillation, crystallisation or chromatography, or by the chemical methods such as the formation of salts, crystallisation of the salts and decomposition of them in an alkaline medium. In carrying out the said chemical methods, the nature of the anion of the salt is immaterial, the only requirement being that the salt must be well-defined and readily crystallisable.

The 5,6-dihydro[2H]-1,4-oxazine derivatives of Formula I may be converted in manner known per se into acid addition and quarternary ammonium salts. The acid addition salts may be obtained by the action of acids on the oxazine derivatives in appropriate solvents. As organic solvents there may be used, for example, alcohols, ethers, ketones or chlorinated hydrocarbons. The salt which is formed is precipitate, if necessary after concentration of its solution, and is separated by filtration or decantation. The quaternary ammonium salts may be obtained by the action of esters on the oxazine bases, optionally in an organic solvent, at room temperature or more rapidly, with gentle heating.

The 5,6 - dihydro[2H] - 1,4 - oxazine derivatives of the present invention, and their acid addition and quaternary ammonium salts, possess interesting pharmacodynamic properties; they are active as antidepressants, central stimulants, anorexigenics, hypertensives and antihypotensives. In the usual tests, they exhibit an antidepressant and central stimulant activity in the mouse when administered orally and in the rat when administered subcutaneously in doses between 0.5 and 10 mg./kg. They also exhibit an anorexigenic activity in the rat in doses between 2 and 20 mg./kg. per os. They also exhibit a hypertensive and antihypotensive activity in the cat when administered intravenously in doses between 0.5 and 5 mg./kg. No substantial acute toxic effects were produced in the test animals at the specified doses. Preferred compounds of Formula I are those in which $R_1$ and $R_2$ represent hydrogen atoms.

For therapeutic purposes, the oxazine base of general Formula I may be employed as such or in the form of non-toxic acid addition salts, i.e. salts containing anions which are relatively innocuous to the animal organism in therapeutic doses of the salts (such as hydrochlorides, sulphates, nitrates, phosphates, acetates, propionates, succinates, benzoates, fumarates, maleates, theophyllineacetates, salicylates, phenolphthalinates and methylene-bis-$\beta$-hydroxynaphtholates) so that the beneficial physiological properties inherent in the bases are not vitiated by side-effects ascribable to the anions. However, they may also be employed in the form of non-toxic quaternary ammonium salts obtained by reaction with organic halides e.g. methyl, ethyl, allyl or benzyl chloride, bromide or iodide, or other reactive esters, e.g. methyl- or ethyl-sulphates, benzene sulphonates or toluene-p-sulphonates.

The following examples illustrate the invention.

EXAMPLE 1

A solution of 3-ethoxy-6-phenyl-5,6-dihydro[2H]-1,4-oxazine (5.85 g.) in 2.5 N ammoniacal ethanol (117 cc.) is heated at 100° C. in an autoclave for 2 hours and then cooled to ambient temperature. The solvent is evaporated under reduced pressure (20 mm. Hg). The orange-coloured oily residue is taken up in ethanol (15 cc.) and the solution obtained is treated with decolorizing charcoal (0.3 g.). To the clear orange-yellow filtrate is added 6.65 N ethanolic hydrogen chloride (4.7 cc.). After cooling for 1 hour at 3° C., the white crystals which have appeared are filtered off, washed three times with iced ethanol (total 12 cc.) to give, after drying, 3-amino-6-phenyl-5,6-dihydro[2H]-1,4-oxazine hydrochloride (2.66 g.), M.P. 234–235° C.

3-ethoxy-6-phenyl-5,6-dihydro[2H]-1,4 - oxazine employed as starting material can be prepared as follows:

Preparation of 1-phenyl-2-aminoethanol according to G. I. Poos et coll., J. Med. Chem., 6, 266 (1963).

Preparation of 6-phenyl - 3-morpholinone (10.3 g.), M.P. 112–114° C., by the action of ethyl chloroacetate (19.8 g.) on 1-phenyl-2-aminoethanol (22.15 g.), previously sodated by sodium hydride (4.15 g.), in benzene under reflux.

Preparation of 3-ethoxy-6-phenyl-5,6 - dihydro[2H]-1,4-oxazine (6.3 g.), B.P. 89–93° C., by the action of triethyloxonium fluoroboride (10.7 g.) on 6-phenyl-3-morpholinone (10.0 g.) in methylene chloride, at ambient temperature.

EXAMPLE 2

A solution of dl-cis-3-ethoxy-5-methyl-6-phenyl-5,6-dihydro[2H]-1,4-oxazine (13.57 g.) in 2.5 N ammoniacal ethanol (200 cc.) is heated at 100° C. in an autoclave for 2 hours. The reaction mixture is cooled to ambient temperature and the solvent is then evaporated under reduced pressure (20 mm. Hg). The pale yellow oily residue is taken up in ethanol (56 cc.) and the solution obtained is treated with decolorizing charcoal (0.5 g.). To the pale yellow clear filtrate is added 8.46 N ethanolic hydrogen chloride (7.9 cc.). After cooling for one hour at 3° C., the crystals which have appeared are filtered off, washed three times with iced ethanol (total 7.5 cc.) to give, after drying, dl-cis-3-amino-5-methyl-6-phenyl-5,6-dihydro[2H]-1,4 - oxazine hydrochloride (3.01 g.), M.P. 246–248° C.

The dl-cis - 3 - ethoxy - 5 - methyl-6-phenyl-5,6-dihydro-[2H]-1,4-oxazine employed as starting material can be prepared as follows: Preparation of dl-cis-5-methyl-6-phenyl-3-morpholinone according to F. H. Clarke, J. Org. Chem. 27, 3253 (1962).

Preparation of dl-cis-3 - ethoxy-5-methyl-6-phenyl-5,6-dihydro[2H]-1,4-oxazine (13.8 g.), B.P. 85–90° C., by the action of triethyloxonium fluoroboride (25.5 g.) on dl-cis-5-methyl-6-phenyl-3 - morpholinone (25.6 g.) in methylene chloride at ambient temperature.

The present invention includes within its scope pharmaceutical compositions containing, as active ingredient, at least one of the 1,4-oxazine derivatives of general Formula I, or non-toxic acid addition or quaternary ammonium salt thereof, in association with a pharmaceutical carrier or coating. The invention includes especially such preparations made up for oral, parenteral or rectal administration.

Solid compositions for oral administration include tablets, pills, powders, and granules. In such solid compositions the active compound is admixed with at least one inert diluent such as sucrose, lactose or starch. The compositions may also comprise, as is normal practice, additional substances other than inert diluents, e.g. lubricating agents, such as magnesium stearate. Liquid compositions for oral administration include pharmaceutically-acceptable emulsions, solutions, suspensions, syrups and elixirs containing inert diluents commonly used in the art, such as water and liquid paraffin. Besides inert diluents such compositions may also comprise adjuvants, such as wetting, emulsifying and suspending agents, and sweetening, flavouring and aromatizing agents. The compositions according to the invention, for oral administration, also include capsules of absorbable material such as gelatin containing the active substance with or without the addition of diluents or excipients.

Preparations according to the invention for parenteral administration include sterile aqueous or non-aqueous solutions, suspensions or emulsions. Examples of non-aqueous solvents or vehicles are propylene glycol, polyethylene glycol, vegetable oils, such as olive oil, and injectable organic esters such as ethyl oleate. These compositions may also contain adjuvants such as preserving, wetting, emulsifying and dispersing agents. They may be sterilised by, for example, filtration through a bacteria-retaining filter, by incorporation in the compositions of sterilising agents, by irradiation, or by heating. They may also be manufactured in the form of sterile solid compositions, which can be dissolved in sterile water or some other sterile injectable medium immediately before use.

Compositions for rectal administraton are suppositories which contain, in addition to the active substance, excipients such as cacao butter or a suitable wax base.

The percentage of active ingredient in the compositions of the invention may be varied, it being necessary that it should constitute a proportion such that a suitable dosage shall be obtained. The dosage depends on the desired therapeutic effect, on the route of administration and on the duration of the treatment. In human therapy the compositions when administered orally should generally give between 5 mg. and 100 mg. of active substance per day for an adult.

The following example illustrates pharmaceutical compositions according to the invention.

EXAMPLE 3

Tablets having the following composition are prepared by the usual technique:

| | Mg. |
|---|---|
| 3-amino-6-phenyl-5,6 - dihydro[2H] - 1,4 - oxazine hydrochloride | 12 |
| Starch | 102 |
| Colloidal silica | 33 |
| Magnesium stearate | 3 |

We claim:
1. A 1,4-oxazine derivative of the formula:

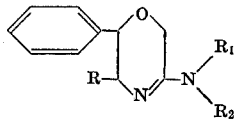

wherein R, $R_1$ and $R_2$ represents hydrogen or alkyl of 1 through 5 carbon atoms, and non-toxic acid addition and quaternary ammonium salts thereof.

2. A 1,4-oxazine derivative according to claim 1 wherein $R_1$ and $R_2$ represent hydrogen.

3. The 1,4-oxazine derivative according to claim 1 which is 3-amino-6-phenyl-5,6-dihydro[2H]-1,4-oxazine, and its non-toxic acid addition salts.

4. The 1,4-oxazine derivative according to claim 1 which is dl-cis-3-amino-5-methyl-6-phenyl - 5,6-dihydro-[2H]-1,4-oxazine, and its non-toxic acid addition salts.

References Cited

UNITED STATES PATENTS 3,308,121   3/1967   Gannon et al. _____ 260—244

HENRY R. JILES, Primary Examiner

G. T. TODD, Assistant Examiner

U.S. Cl. X.R.

424—248